(12) United States Patent
Ku

(10) Patent No.: US 10,746,261 B2
(45) Date of Patent: Aug. 18, 2020

(54) GEAR ASSEMBLY AND A DOOR MOUNT MECHANISM INCLUDING THE SAME

(71) Applicant: CANDY HOUSE INC., Palo Alto, CA (US)

(72) Inventor: Che-Ming Ku, Taichung (TW)

(73) Assignee: CANDY HOUSE INC., Palo Alto, CA (US)

( * ) Notice: Subject to any disclaimer, the term of this patent is extended or adjusted under 35 U.S.C. 154(b) by 323 days.

(21) Appl. No.: 15/117,131

(22) PCT Filed: Oct. 7, 2015

(86) PCT No.: PCT/US2015/054503
§ 371 (c)(1),
(2) Date: Aug. 5, 2016

(87) PCT Pub. No.: WO2016/057675
PCT Pub. Date: Apr. 14, 2016

(65) Prior Publication Data
US 2017/0037937 A1    Feb. 9, 2017

Related U.S. Application Data

(60) Provisional application No. 62/061,212, filed on Oct. 8, 2014.

(51) Int. Cl.
  *E05B 47/00* (2006.01)
  *F16H 3/46* (2006.01)
  (Continued)

(52) U.S. Cl.
  CPC ........... *F16H 3/46* (2013.01); *E05B 47/0002* (2013.01); *E05B 47/0012* (2013.01);
  (Continued)

(58) Field of Classification Search
CPC ... F16H 3/46; F16H 63/34; F16H 3/54; F16H 2063/305; F16H 2200/2005; F16H 2200/2033; E05B 47/0002; E05B 47/0012; E05B 47/0046; E05B 2047/0022; E05B 2047/91; E05B 49/00; E05B 65/06;
(Continued)

(56) References Cited

U.S. PATENT DOCUMENTS 3,154,302 A * 10/1964 Maruyama ............ E05F 15/616
                                                        475/154
4,557,124 A * 12/1985 Russ .................... H01M 2/1055
                                                        70/456 R
(Continued)

OTHER PUBLICATIONS

International Search Report, PCT/US15/54503, dated Jan. 4, 2016 (2 pages).

*Primary Examiner* — Nathan Cumar
(74) *Attorney, Agent, or Firm* — Hamre, Schumann, Mueller & Larson, P.C.

(57) ABSTRACT

A gear assembly includes a planetary gear set and a clutch. The planetary gear set includes a sun gear, at least one planet gear meshing with the sun gear, a carrier supporting the at least one planet gear, and an outer ring gear meshing with the at least one planet gear. The clutch is operable to engage with and disengage from the planetary gear set to enable the planetary gear set to switch between a first mode and a second mode.

14 Claims, 12 Drawing Sheets

(51) Int. Cl.
*F16H 63/34* (2006.01)
*E05C 1/10* (2006.01)
*F16H 3/54* (2006.01)
*F16H 63/30* (2006.01)

(52) U.S. Cl.
CPC .......... *E05B 47/0046* (2013.01); *E05C 1/10* (2013.01); *F16H 63/34* (2013.01); *E05B 2047/0022* (2013.01); *E05B 2047/0091* (2013.01); *F16H 3/54* (2013.01); *F16H 2063/305* (2013.01); *F16H 2200/2005* (2013.01); *F16H 2200/2033* (2013.01)

(58) Field of Classification Search
CPC ........ E05B 47/00; E05C 1/10; Y10T 70/7113; Y10T 70/7068; Y10T 70/5978; Y10T 70/5319; Y10T 70/7706; Y10T 70/8865
USPC ............... 292/164, 244; 70/278.1, 129, 280, 70/379 R, 462
See application file for complete search history.

(56) References Cited

U.S. PATENT DOCUMENTS

| | | | | |
|---|---|---|---|---|
| 4,691,584 A | * | 9/1987 | Takaishi | E05B 81/06 292/144 |
| 5,044,678 A | * | 9/1991 | Detweiler | E05B 47/026 292/144 |
| 5,592,839 A | * | 1/1997 | Hasan | A45C 11/327 70/456 R |
| 5,678,436 A | * | 10/1997 | Alexander | E05B 47/0012 70/256 |
| 5,704,235 A | * | 1/1998 | Stahle | A45C 11/324 206/37.1 |
| 5,841,637 A | * | 11/1998 | Chhatwal | H05K 9/0067 361/753 |
| 5,887,468 A | * | 3/1999 | Hasan | A45C 11/321 70/456 R |
| 6,216,502 B1 | * | 4/2001 | Cannella | E05B 47/0012 292/142 |
| 6,324,879 B1 | * | 12/2001 | Kennedy | E05B 13/001 70/416 |
| 6,591,643 B1 | * | 7/2003 | Cannella | E05B 47/0012 292/142 |
| 6,742,369 B1 | * | 6/2004 | Veillette | E05B 13/002 292/288 |
| 7,373,795 B2 | * | 5/2008 | Kilbourne | E05B 47/0012 292/244 |
| 8,869,574 B2 | * | 10/2014 | Schmidt-Lackner | E05B 17/147 292/244 |
| 9,476,232 B1 | * | 10/2016 | Verdecia | E05B 19/00 |
| 9,624,695 B1 | * | 4/2017 | Cheng | E05B 47/026 |
| 2006/0005598 A1 | * | 1/2006 | Willis | B21C 37/0822 72/367.1 |
| 2009/0084147 A1 | * | 4/2009 | Mizutani | E05B 9/02 70/277 |
| 2013/0201591 A1 | | 8/2013 | Dimig et al. | |
| 2014/0183388 A1 | | 7/2014 | Herbert et al. | |

\* cited by examiner

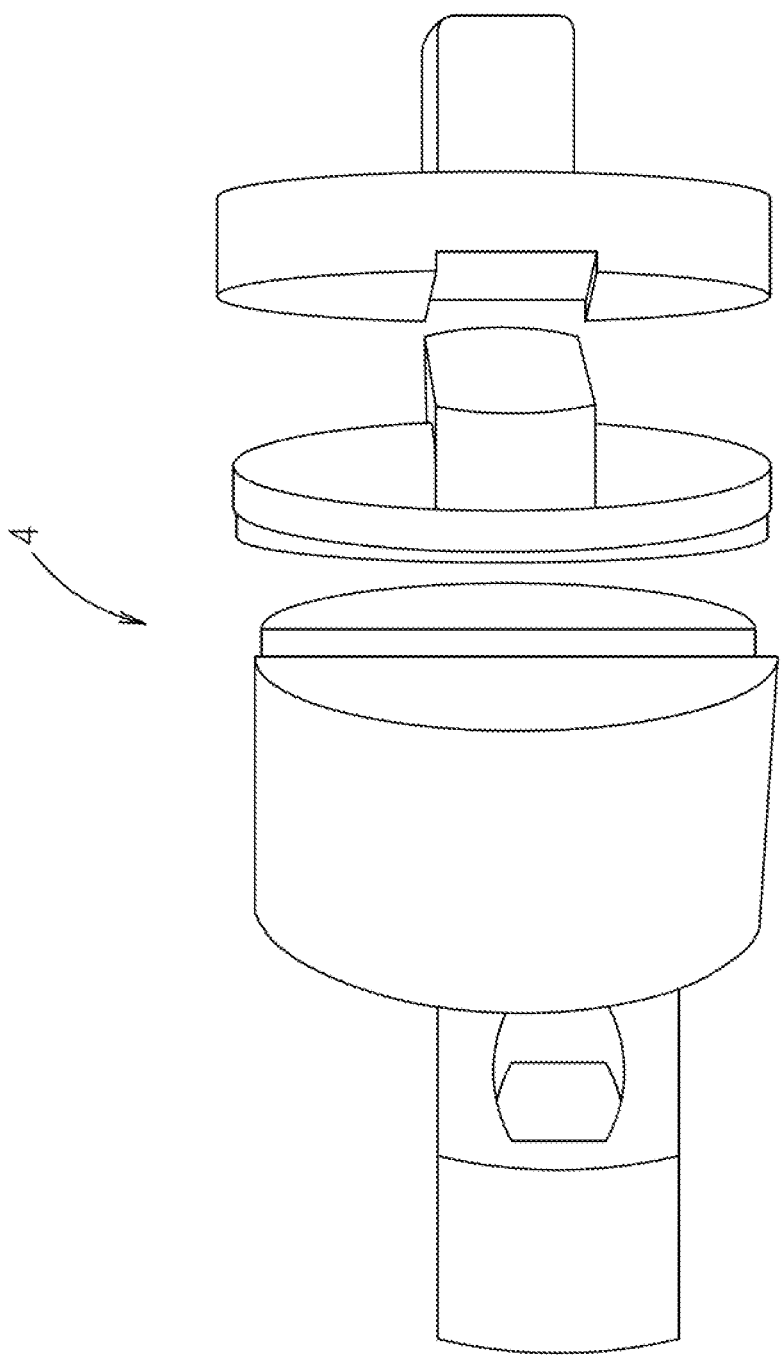
F I G. 4

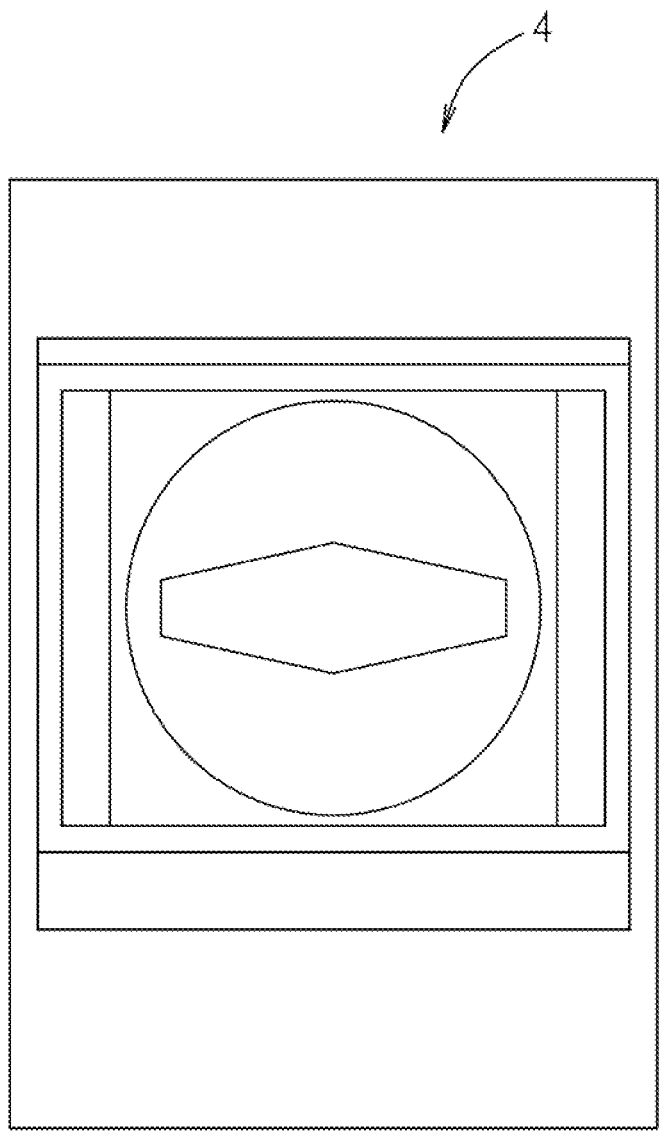
F I G. 5

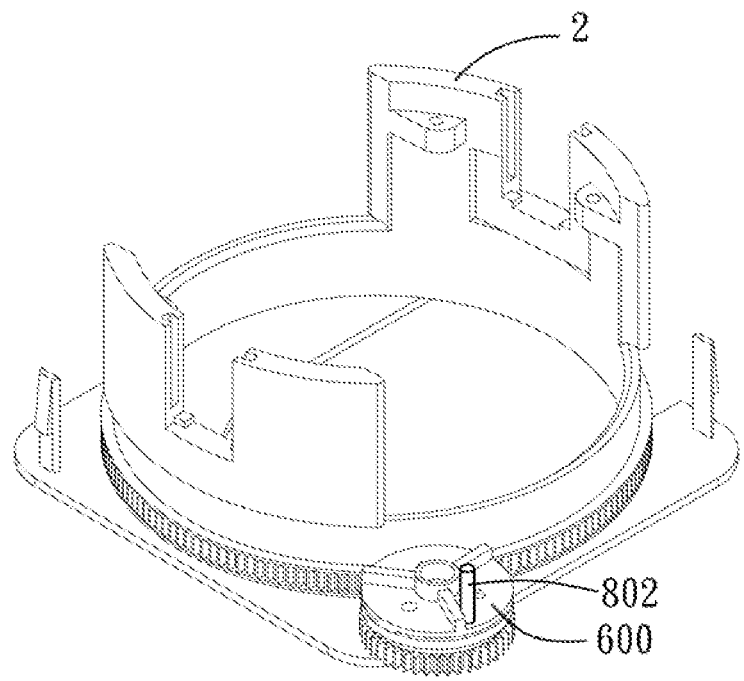
F I G. 7A
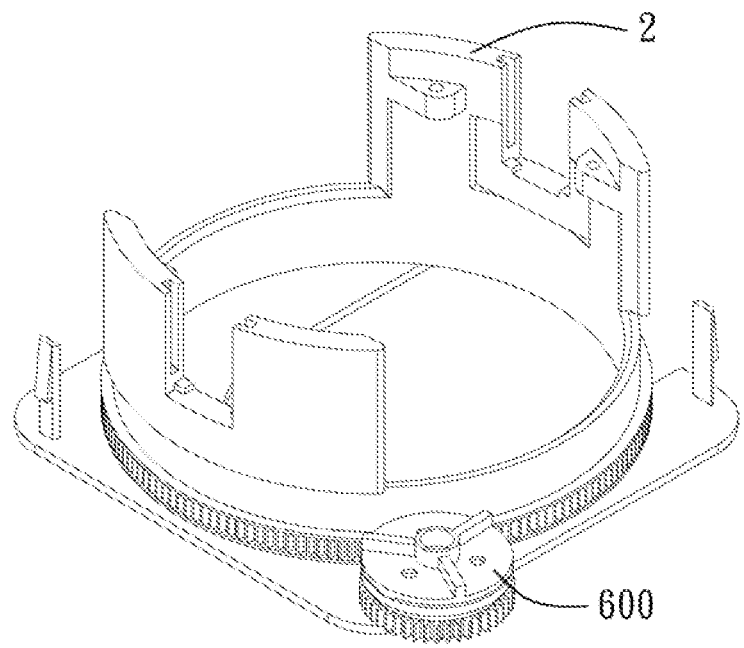
F I G. 7B

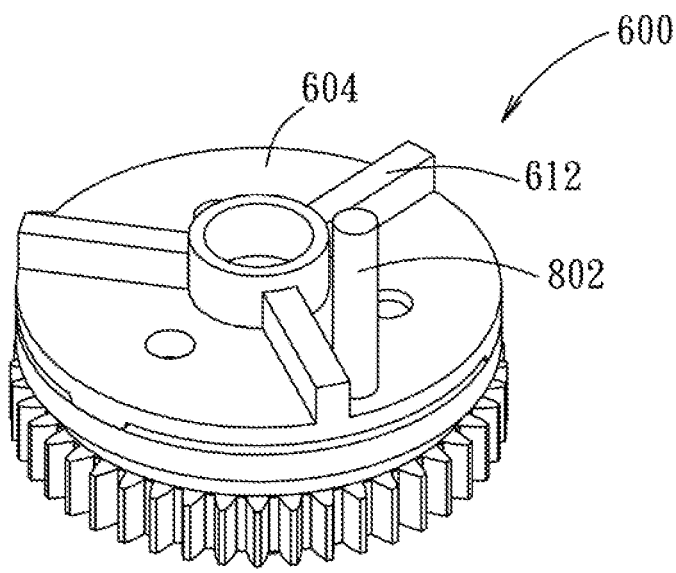
F I G. 9A
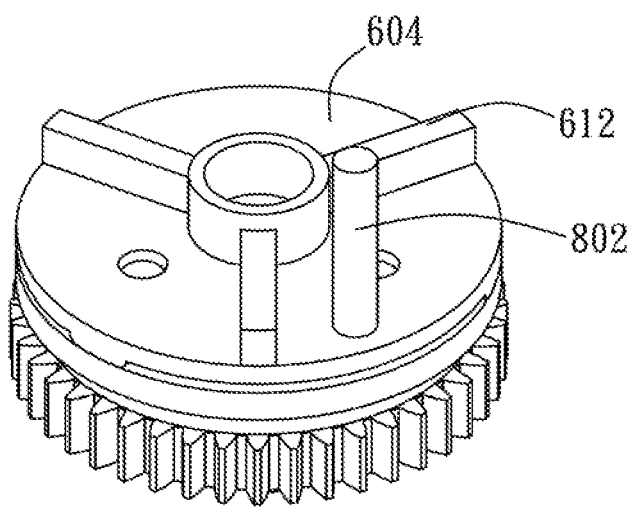
F I G. 9B

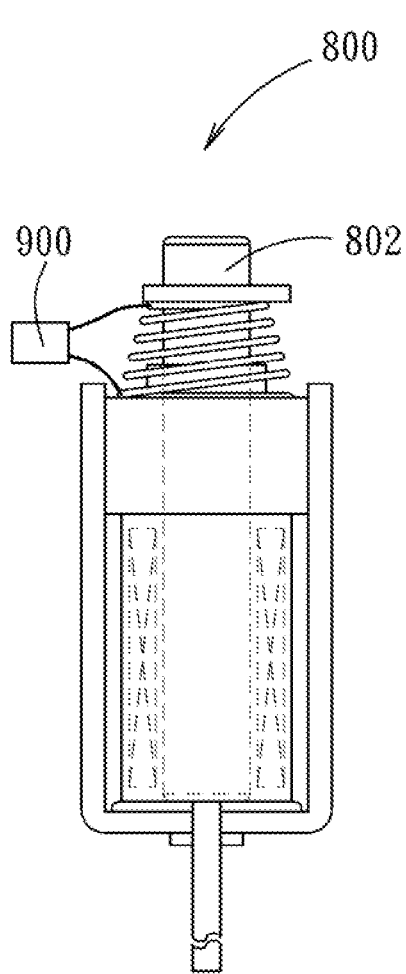 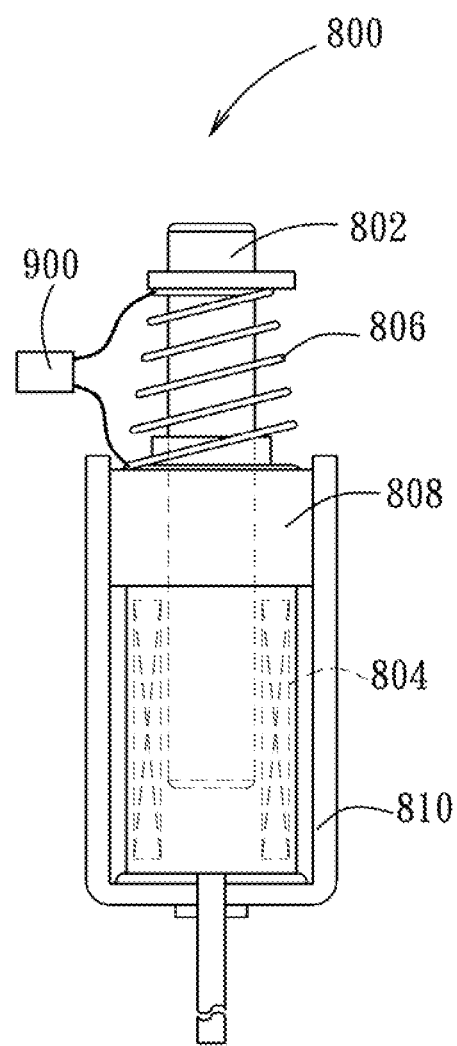
F I G. 11A  F I G. 11B

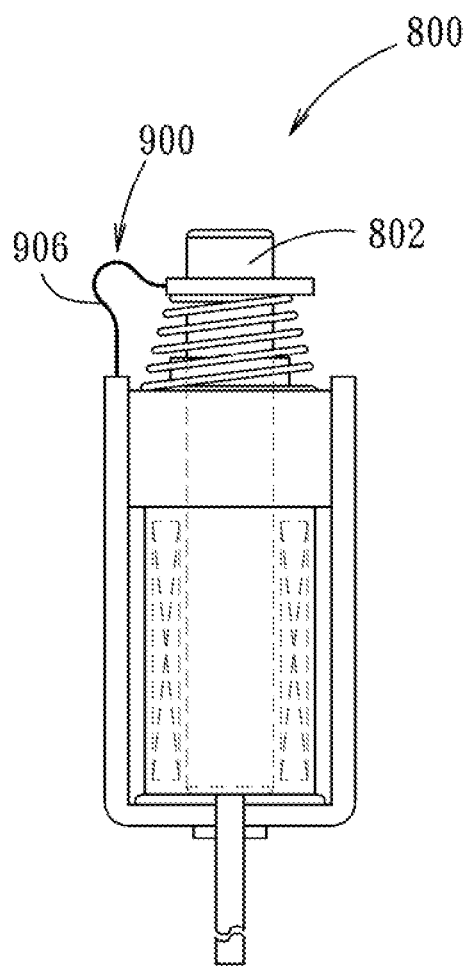 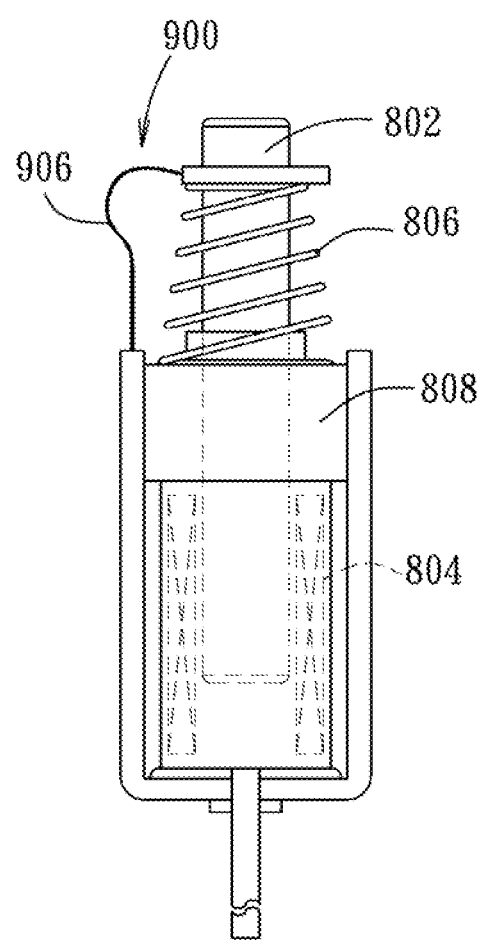
F I G. 12A    F I G. 12B

GEAR ASSEMBLY AND A DOOR MOUNT MECHANISM INCLUDING THE SAME

CROSS-REFERENCE TO RELATED APPLICATION

This application claims priority of U.S. Provisional Application No. 62/061,212, filed on Oct. 8, 2014.

FIELD

The disclosure relates to a gear assembly and a door mount mechanism, more particularly to a gear assembly including a planetary gear set and a clutch, and a door mount mechanism including the gear assembly.

BACKGROUND

Electronic security systems have been developed for a number of years. Recently, electronic technology has been used in combination with a traditional door lock to provide smart look functionality. A disadvantage of such smart lock resides in that replacement of an existing lock is inevitable, and the installation process of the new smart lock is relatively complicated and time-consuming. Moreover, installation of the smart lock also requires a specialized manual labor to use tools for mounting the smart lock and a corresponding system.

Accordingly, there is a smart lock that may be attached to the existing lock. One of the key elements of the smart lock is a gear mechanism to be driven by a motor for rotating a thumb knob of the existing lock. The gear mechanism should have high efficiency and increased torque capability to save energy. However, the relatively high torque, i.e., the rotational resistance of the motor when the motor is not operating, makes it difficult to turn the smart lock manually.

SUMMARY

Therefore, an object of the disclosure is to provide a gear assembly and a door mount mechanism including the same which enable automatic turning of a thumb turn of a door lock using a motor via the gear assembly while allowing easy manual operation of the door mount mechanism when required.

According to a first aspect of the disclosure, the gear assembly includes a planetary gear set and a clutch. The planetary gear set includes a sun gear, at least one planet gear meshing with the sun gear, a carrier supporting said at least one planet gear, and an outer ring gear meshing with said at least one planet gear. The clutch is operable to engage with and disengage from the planetary gear set to enable the planetary gear set to switch between a first mode and a second mode.

According to a second aspect of the disclosure, the door mount mechanism is configured for a smart lock system. The door mount mechanism is adapted to be mounted onto a door for rotating a thumb turn of a door lock which is mounted on the door. The door mount mechanism includes a casing, a rotatable component, an intermediate coupling and an actuating unit. The casing has a door-mounting end that is adapted for abutting against the door, and defining a receiving space that is adapted for receiving the door lock, and that has an opening at the door-mounting end and adapted for extension of the door lock therethrough. The rotatable component is coupled rotatably to the casing. The intermediate coupling is connected co-rotatably to the rotatable component, and is adapted for driving rotation of the thumb turn of the door lock such that the thumb turn is co-rotatable with the rotatable component. The actuating unit is controllable to actuate rotation of the rotatable component, and includes a motor and a gear assembly. The gear assembly includes a planetary gear set and a clutch. The planetary gear set is drivers rotatably by the motor, and includes a sun gear, at least one planet gear meshing with the sun gear, a carrier supporting said at least one planet gear, and an outer ring gear meshing with said at least one planet gear. The clutch is operable to engage with and disengage from the planetary gear set to enable the planetary gear set to switch between a first mode and a second mode.

BRIEF DESCRIPTION OF THE DRAWINGS

Other features and advantages of the disclosure will become apparent in the following detailed description of the embodiments with reference to the accompanying drawings, of which:

FIG. 4 is an exploded perspective view of an Oldham coupling;

FIG. 5 is a schematic view of tongue-and-groove mechanisms in combination with a rotational plate;

FIGS. 7A and 7B respectively illustrate a movable armature of an electromechanical solenoid engaging with and disengaging from the planetary gear set;

FIGS. 9A and 9B illustrate that a carrier is rotated to prevent friction between the movable armature and an engagement part during retraction of the movable armature;

FIGS. 11A and 11B illustrate a second implementation of the sensor of the electromechanical solenoid; and FIGS. 12A and 12B illustrate a third implementation of the sensor of the electromechanical solenoid.

DETAILED DESCRIPTION

Figure 1:
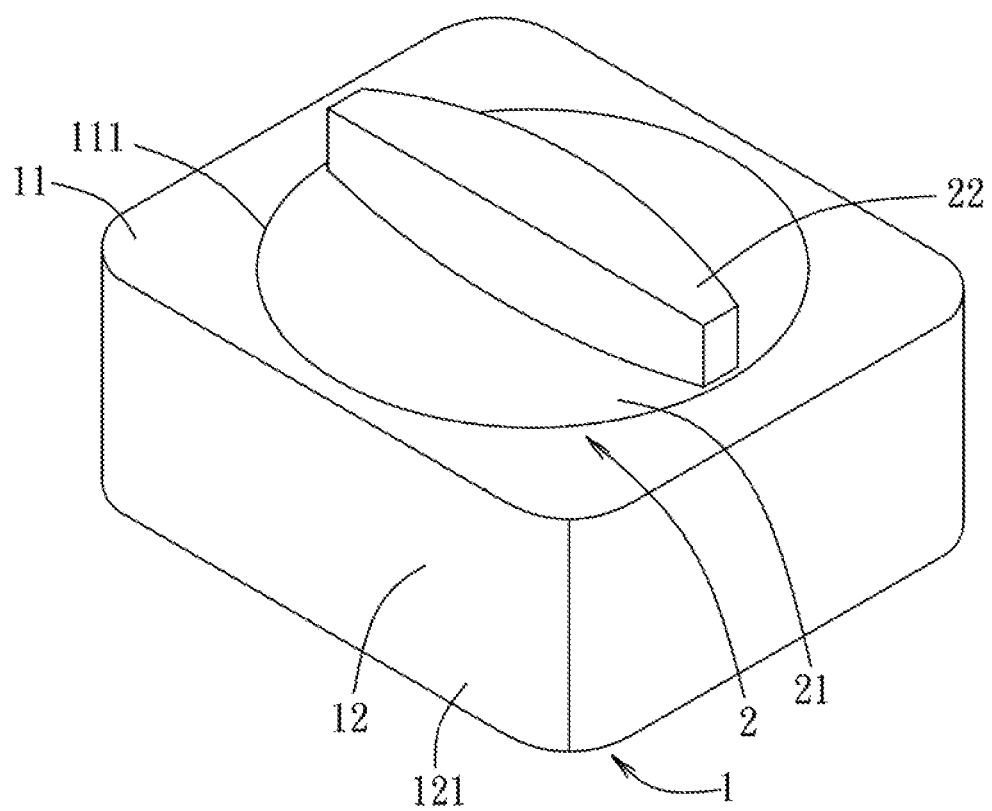
FIG. 1 is a perspective view of an embodiment of a door mount mechanism according to the disclosure.
Figure 2:
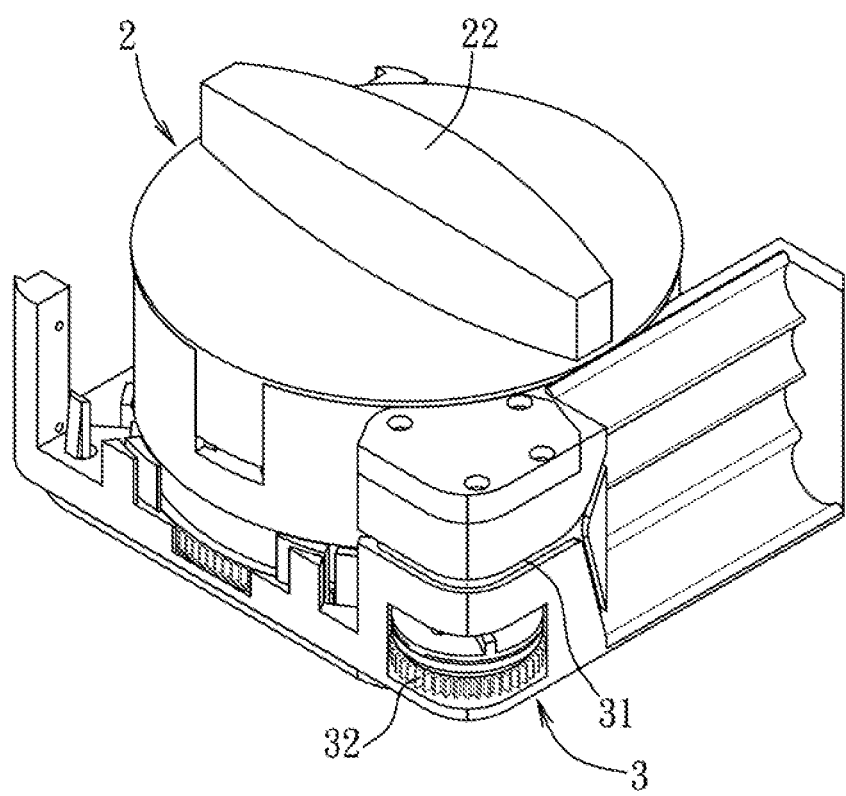
FIG. 2 is a perspective view of a rotatable component and an actuating unit of the embodiment of the door mount mechanism.
Figure 3:
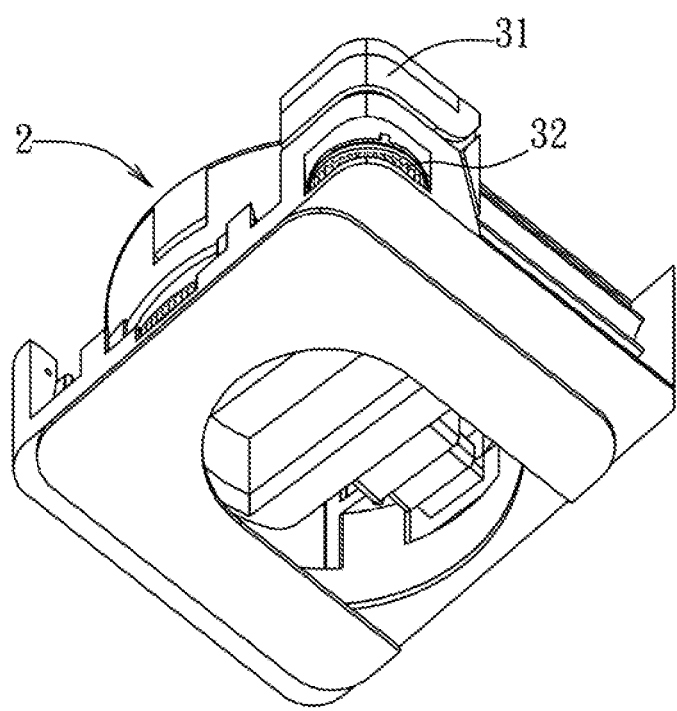
FIG. 3 is another perspective view of the rotatable component and the actuating unit of the embodiment of the door mount mechanism.

As shown in FIGS. 1 to 4, an embodiment of a door mount mechanism, according to the disclosure is adapted for use in a smart lock system, and is adapted to be mounted onto a door (not shown) for rotating a thumb turn (not shown) of a door lock (not shown). The door lock includes a base plate (not shown) which is mounted on the door and on which the thumb turn is rotatably disposed. The door mount mechanism includes a casing 1, a rotatable component 2, an actuating unit 3 and an intermediate coupling 4.

The casing 1 includes a base wall 11, a surrounding wall 12 extending from a periphery of the base wall 11 and cooperating with the base wall 11 to define a receiving space. In this embodiment, the base wall 11 is substantially square. The surrounding wall 12 has a door-mounting end 121, and the receiving space has an opening at the door-mounting end 121 and adapted for extension of the door lock therethrough. In this embodiment, the base wall 11 is formed with a round hole 111.

The rotatable component 2 is coupled rotatably to the casing 1. The rotatable component 2 has a base portion 21 engaging rotatably the round hole 111 of the casing 1, and a knob portion 22 projecting from the base portion 21 away from the receiving space and being accessible to a user.

The actuating unit 3 includes a motor 31 and a gear assembly 32 that includes a planetary gear set 600 (see FIGS. 6A and 6B) and a clutch. The clutch is exemplified as an electromechanical solenoid 800 in this embodiment (see FIGS. 8A and 8B); however, practical implementation of the clutch is not limited to the disclosure herein. The planetary gear set 600 is driven rotatably by the motor 31 of the actuating unit 3 so as to drive rotation of the rotatable component 2. The actuating unit 3 is connected to a control circuit (not shown). During operation of the smart lock system, the control circuit receives commands from a user device, such as a mobile phone, and the actuating unit 3 is activated by signals received from the control circuit to operate to drive rotation of the rotatable component 2. The control circuit in this embodiment is exemplified as a microprocessor.

The door mount mechanism is a universal mechanism to accommodate various configurations of existing door lock. The universal mechanism is robust such that it permits some range of misalignment between the existing door lock and the door mount mechanism. For example, most door locks are designed to be locked/unlocked by turning the thumb turn by ninety degrees (clockwise/counterclockwise), but in reality, the rotational angle required to lock/unlock is not exactly ninety degrees. It may be either more than 90 degrees or less than 90 degrees. Therefore, the door mount mechanism is adaptable for any rotational angle that is not exactly ninety degrees. In another embodiment, the door mount mechanism is adaptable to thumb turn's asymmetry to a shaft (not shown) and the shaft's eccentricity to the base plate.

The door mount mechanism for the smart lock system is especially suitable for activating the thumb turn of a door look for use in a house or an apartment. Further, the door mount mechanism can be easily assembled and disassembled by a user. The intermediate coupling 4 is adapted for driving rotation of the thumb turn of the door lock such that the thumb turn is co-rotatable with the rotatable component 2. The door mount mechanism uses the intermediate coupling 4 to increase the fit across various types of thumb turns of door locks available on the market. For example, the intermediate coupling 4 is one of an Oldham coupling, and tongue-and-groove mechanisms in combination with a rotational plate. However, other types of the intermediate coupling 4 may be used to mitigate or correct misalignments, asymmetry and eccentricity, such as rubber, sponge or a robotic finger. The usage of the intermediate coupling 4 increases the tolerance for misalignment, asymmetry, eccentricity between the existing door lock and the door mount mechanism. The use of the Oldham coupling is illustrated in FIG. 4. The use of the tongue-and-groove mechanisms in combination with the rotational plate is illustrated in FIG. 5.

Figure 6B:
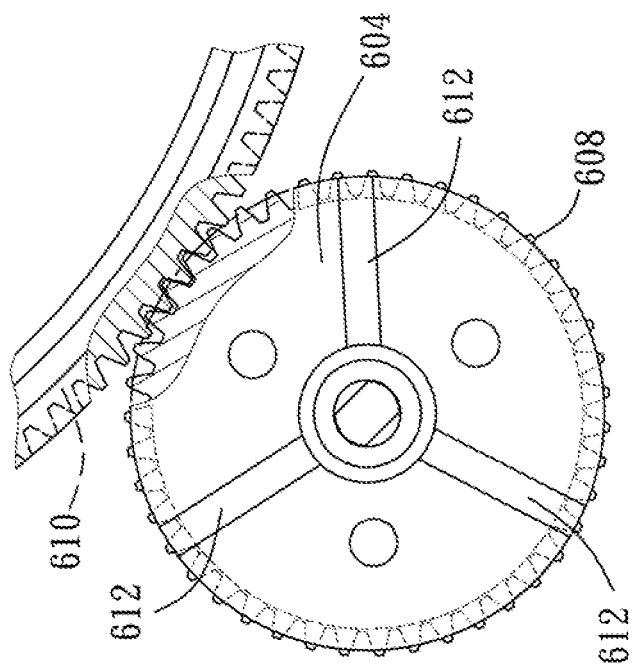
FIGS. 6A and 6B illustrate a bottom view and a top view of a planetary gear set of this embodiment, respectively.
Figure 6A:
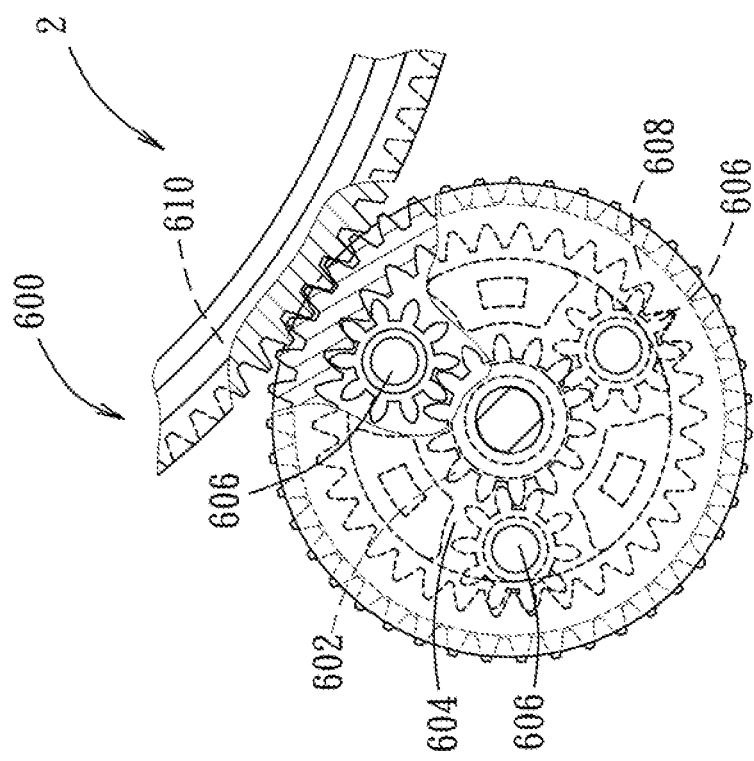

Referring to FIGS. 6A and 6B, a bottom view and a top view of the planetary gear set 600 of this embodiment are illustrated respectively. The planetary gear set 600 includes a sun gear 602, at least one planet gear 606, a carrier 604 and an outer ring gear 608. The sun gear 602 is attached to the motor 31 (see FIG. 2), and is driven rotatably by the motor 31. Three planet gears 606 are given as an example in this embodiment, each of which is of the same size and meshes with the sun gear 602. The carrier 604 supports the planet gears 606, and is rotatable along with revolution of the planet gears 606 around the sun gear 602. The carrier 604 is formed with at least one engagement part 612 for engagement with the electromechanical solenoid 800 (clutch) (see FIG. 8B), and three engagement parts 612 are given as an example in this embodiment. The outer ring gear 609 is formed with inward-facing teeth and meshes with the planet gears 606. The carrier 604 is in connection with the outer ring gear 606 via the planet gears 606. The rotatable component 2 is formed with gear teeth 610 for meshing with the outer ring gear 608 such that the outer ring gear 608 engages with the rotatable component 2. The electromechanical solenoid 800 is coupled electrically to the control circuit, is operable to engage with and disengage from the planetary gear set 600 to enable the planetary gear set 600 to switch between a first mode (e.g., an automatic mode) and a second mode (e.g., a manual mode).

A planetary gear set, compared with a parallel axis gear set, has relatively high power density. In addition, the planetary gear set further has advantages of a reduced volume, multiple kinematic combinations, purely torsional reactions, and coaxial shafting. The planetary gear set also includes properties of high bearing loads, constant lubrication requirements, inaccessibility, and design complexity. The efficiency loss in the planetary gear set is about 3% per stage, and such high efficiency ensures that a high percentage of energy being input is transmitted through the planetary gear set, rather than being wasted on mechanical losses inside the planetary gear set. Further, load in the planetary gear set is shared among multiple planet gears such that torque capability of the planetary gear set is increased. In this way, the more planet gears are employed in the planetary gear set, the greater the load capability and the higher the torque density. The planetary gear set also provides stability due to an even distribution of mass and increased rotational stiffness. Torque applied radially onto gears of the planetary gear set is transferred radially by the gears, without lateral pressure on gear teeth of the gears.

FIG. 7A is a perspective view illustrating a portion of the rotatable component 2, the planetary gear set 600, and a movable armature 802 of the electromechanical solenoid 800 (i.e., the clutch and see FIG. 8B) of this embodiment according to the disclosure. The planetary gear set 600 enables high efficiency and increased torque capability to save energy. However, the high torque makes it difficult to manually torn the rotatable component 2 which is attached to the planetary gear set 600. Accordingly, a controlling clutch switching mechanism (i.e., the electromechanical solenoid 800 as exemplified in this embodiment) is introduced, which when powered, enables the planetary gear set 600 to switch between the automatic mode and the manual mode.

Accordingly, in the automatic mode, the movable armature 802 of the electromechanical solenoid 800 is controlled to engage with one of the engagement parts 612 of the carrier 604 (see FIGS. 6B, 7A and 8B) to limit movement of the carrier 604 such that rotation of the sun gear 602 drives the planet gears 606 to spin on respective axes of the planet gears 606 without revolving around the sun gear 602 so as to drive rotation of the outer ring gear 609. In this way, the movable armature 802 of the electromechanical solenoid 300 (shown in FIG. 8B) abuts against one of the engagement parts 612 of the carrier 604 to allow the engagement of the motor 31 with the rotatable component 2 via the planetary gear set 600 for turning the rotatable component 2. The motor 31 actuates rotation of the sun gear 602, which then transmits torque to the planet gears 606, which then transmit the torque to the outer ring gear 603, which finally transmits the torque to the gear teeth 610 of the rotatable component 2 so as to rotate the thumb turn of the door lock via the intermediate coupling 4. The high torque capability of the planetary gear set 600 allows the motor 31 to turn the rotatable component 2 with high efficiency so as to significantly increase battery life of the door mount mechanism.

Moreover, in the automatic mode, when the motor 31 is not operating and is not driving rotation of the sun gear 602, rotation of the rotatable component 2 is hindered by rotational resistance of the motor 31, such that an extra-lock functionality is achieved.

On the other hand, in the manual mode, the movable armature 802 of the electromechanical solenoid 300 is controlled to disengages from the engagement parts 612 of the carrier 604 (see FIGS. 6B, 7B and 8A) to allow movement of the carrier 604 such that the planet gears 606 are spinnable on the respective axes of the planet gears 606 and are revolvable around the sun gear 602 so as to allow free rotation of the outer ring gear 608. Specifically, the movable armature 802 of the electromechanical solenoid 800 is disengaged from the engagement parts 612 of the carrier 604, and enables the planetary gear set 600 to rotate freely. The motor 31 in combination with the sun gear 602 is thus disengaged from the rotatable component 2 due to the free movement of the carrier 604. The rotatable component 2 can then be turned manually with ease. The free rotation of the planetary gear set 600 allows manual turning of the rotatable component 2 with almost zero torque without being hindered by rotational resistance of the motor 31. The gear teeth 610 formed on the rotatable component 2 transmit torque via the outer ring gear 608 to the planet gears 606 and the carrier 604, and the planet gears 606 may spin on the respective axes of the planet gears 606 and revolve around the sun gear 602 while the sun gear 602 is kept stationary due to the rotational resistance of the motor 31, such that the outer ring gear 608 may rotate freely and the rotatable component 2 may be manually turned with ease. In this way, more battery life is saved while the door mount mechanism is being used in the manual mode.

Figure 8A:
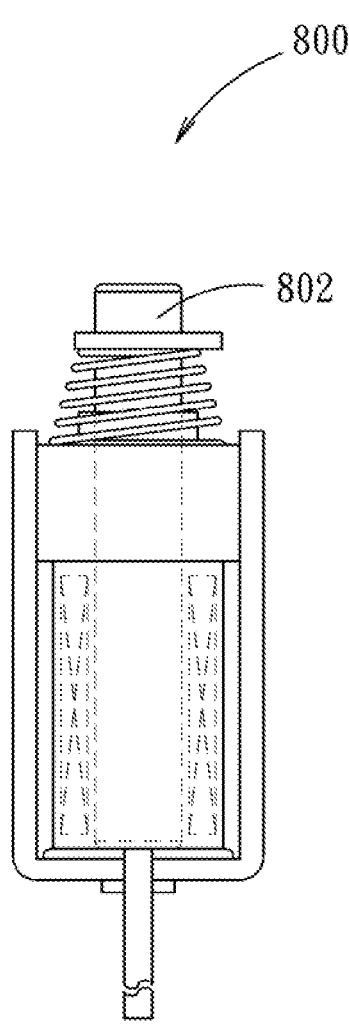
FIGS. 8A and 8B respectively illustrate retraction and extension of the movable armature of this embodiment according to the disclosure.
Figure 8B:
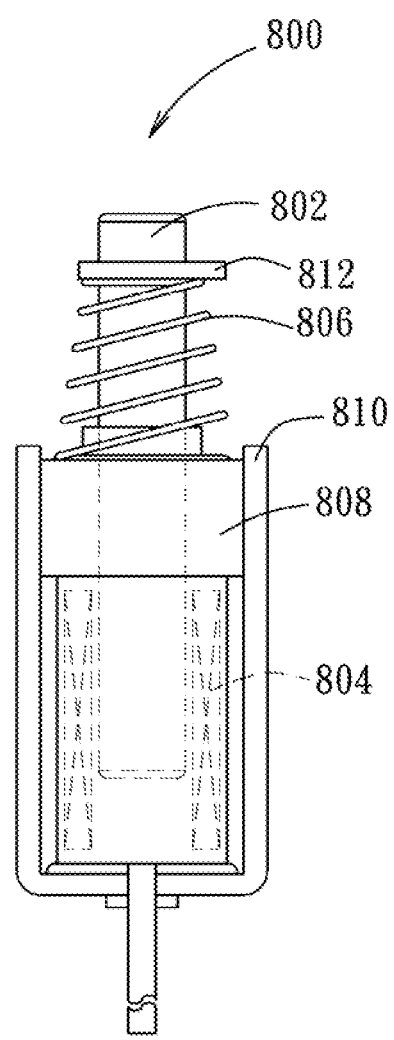

Referring to FIGS. 8A and 8B, the electromechanical solenoid 800 of this embodiment of the disclosure is illustrated. The electromechanical solenoid 800 includes the movable armature 802, an electromagnetically inductive coil 804, an electrically conductive housing 810, a dielectric cover 808 and a spring 806. The movable armature 802 is exemplified as an iron rod in this embodiment. The electromagnetically inductive coil 804 is wound around the movable armature 802, produces an induced magnetic field when provided with an electric current for applying forces to control extension and retraction of the movable armature 802 relative to said electromagnetically inductive coil 804 (i.e., extension and retraction of the movable armature 302 relative to the electrically conductive housing 810) for engaging with or disengaging from the engagement parts 612 of the carrier 604 (see FIG. 6B). The electrically conductive housing 810 accommodates the electromagnetically inductive coil 804 therein, is formed with an opening to permit movable extension of the movable armature 802 therethrough into said electrically conductive housing 810, and is made of iron in this embodiment. The dielectric cover 808 covers the opening of the electrically conductive housing 810, and is formed with a hole for the extension and retraction of the movable armature 802 therethrough. The dielectric cover 808 accommodates a permanent magnet (not shown) therein for magnetization of the electrically conductive housing 810 and the movable armature 302. The spring 806 has two ends abutting against the dielectric cover 808 and a stopper member 812 fixed onto the movable armature 802, respectively.

When a low burst of the electric current is applied to the electromagnetically inductive coil 804, an outward force is produced by the induced magnetic field in combination with resilience of the spring 806 so as to extend the movable armature 802. The outward force is greater than the pull force associated with the permanent magnet. When extended, the movable armature 802 contacts the carrier 604. As the carrier 604 rotates, the spring 806 further extends the movable armature 802 which then engages in an optimal position with respect to the planetary gear set 600 (i.e., abutting against the engagement parts 612 of the carrier 604) to enable the planetary gear set 600 to operate in the automatic mode. The movable armature 802 may be retracted using another low burst of the electric current which induces the electromagnetically inductive coil 304 with an inward force overcoming the resilience of the spring 806, such that the movable armature 802 is locked by the permanent magnet to enable the planetary gear set 600 to operate in the manual mode.

In addition, to switch the planetary gear set 600 from the automatic mode (see FIG. 9A) to the manual mode, the carrier 604 is driven by the motor 31 via the sun gear 602 and the planet gears 606 so as to rotate away from the movable armature 802 of the electromechanical solenoid 800 (see FIG. 9B) (e.g., in a direction opposite to the direction during a previous rotational movement) to prevent friction between the movable armature 802 and the engagement parts 612 during retraction of the movable armature 802.

Moreover, in this embodiment, the electromechanical solenoid 800 further includes a sensor 900 (see FIGS. 10A to 12B) which detects the extension and retraction of the movable armature 802.

Figure 10A:
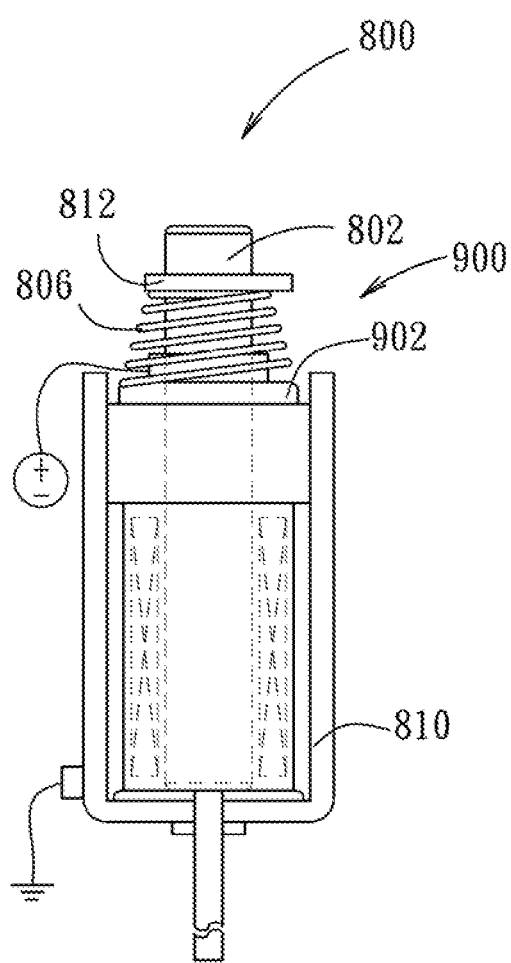
FIGS. 10A and 10B illustrate a first implementation of a sensor of the electromechanical solenoid.
Figure 10B:
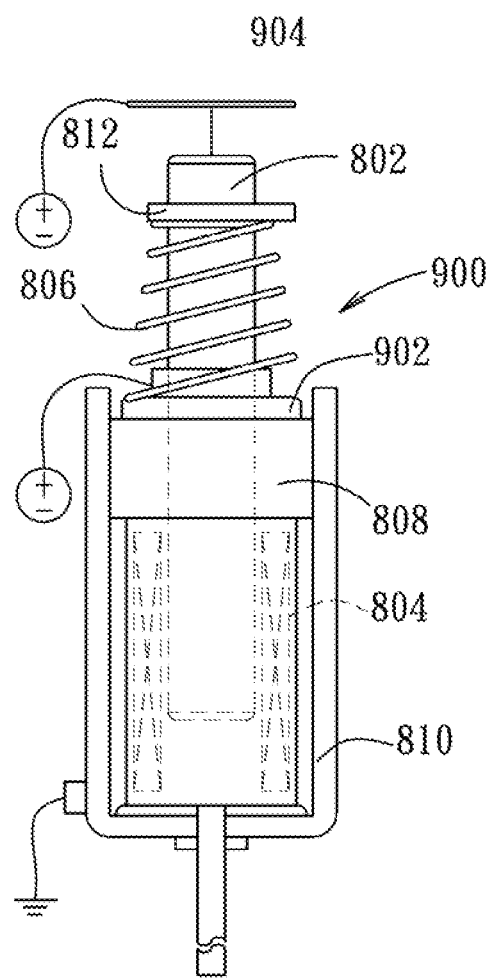

Referring to FIGS. 10A and 10B, a first implementation of the sensor 900 of the electromechanical solenoid 800 is illustrated. The electrically conductive housing 810 is grounded, and the dielectric cover 808 provides electrical insulation between the movable armature 802 and the opening of the electrically conductive housing 810. The sensor 900 includes an electrically conductive member 902 which is disposed on the dielectric cover 808, which is electrically connected to the movable armature 802 via the spring 806 and the stopper member 812, and which is applied with a voltage, such as a pull-high voltage, 5V.

Referring to FIG. 10A, when the movable armature 802 is retracted and is in electrical contact with a bottom of the electrically conductive housing 810 such that the electrically conductive member 902 is grounded via the spring 806, the stopper member 812, the movable armature 802 and the electrically conductive housing 810, variation in voltage of the electrically conductive member 902 is measured by a microprocessor so as to determine the retraction of the movable armature 802.

Referring to FIG. 10B, when the movable armature 802 is extended and is not in electrical contact with the bottom of the electrically conductive housing 810, the electrically conductive member 902 is not grounded, such that the electrically conductive member 902 is measured by the microprocessor to maintain at the voltage (i.e., 5V) so as to determine the extension of the movable armature 802.

In addition, the sensor 900 may further include a sensor plate 904 which is disposed relative to the movable armature 802, and which is provided with another voltage, such as 3V. In this way, when the movable armature 802 is extended further to touch the sensor plate 904, the electrically conductive member 902 is electrically coupled to the sensor plate 904 via the spring 806, the stopper member 812 and the movable armature 802, such that variation in voltage of the electrically conductive member 902 (e.g., from 5V to 8V) is measured by the microprocessor so as to determine that the movable armature 802 has reached a desired position to touch the sensor plate 904.

Referring to FIGS. 11A and 11B, a second implementation of the sensor 900 of the electromechanical solenoid 800 is illustrated. The sensor 900 includes a Wheatstone bridge (not shown). When the movable armature 902 is retracted or extended such that a length of the spring 806 is changed, the Wheatstone bridge of the sensor 900 measures variation in electrical resistance of the spring 806 so as to determine the retraction and extension of the movable armature 802.

Referring to FIGS. 12A and 12B, a third implementation of the sensor 900 of the electromechanical solenoid 800 is illustrated. The sensor 900 includes a strain gage 906 which has one end attached to the movable armature 802, and another end attached to the electrically conductive housing 810. The sensor 900 further includes a Wheatstone bridge (not shown) coupled electrically to the strain gage 906. When the movable armature 802 is retracted or extended such that the strain gage 906 is deformed, the Wheatstone bridge of the sensor 900 measures variation in electrical resistance of the strain gage 906 so as to determine the retraction and extension of the movable armature 802.

To sum up, by means of the electromechanical solenoid 800 which is operable to engage with and disengage from the carrier 604 of the planetary gear set 600, the planetary gear set 600 may be switched between the automatic mode, in which the rotatable component 2 may be driven to rotate by the motor 31, and the manual mode, in which the rotatable component 2 may be manually rotated with ease.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A gear assembly comprising:
    a planetary gear set which includes
        a sun gear,
        at least one planet gear meshing with said sun gear,
        a carrier supporting said at least one planet gear, and
        an outer ring gear meshing with said at least one planet gear; and
    a clutch which is operable to engage with and disengage from said planetary gear set to enable said planetary gear set to switch between a first mode and a second mode,
    wherein said clutch is an electromechanical solenoid which includes:
        a movable armature,
        an electromagnetically inductive coil which is wound around said movable armature, which produces an induced magnetic field when provided with an electric current for applying forces to control extension and retraction of said movable armature relative to said electromagnetically inductive coil for engaging or disengaging said movable armature from said carrier, and
        a sensor which detects the extension and retraction of said movable armature,
    wherein said carrier is formed with at least one engagement part, said electromechanical solenoid is operable to engage with said engagement part for enabling said planetary gear set to operate in the first mode, and is operable to disengage from said engagement part for enabling said planetary gear set to operate in the second mode
    said movable armature is controlled to retract so as to disengage from said engagement part of said carrier to switch said planetary gear set from the first mode to the second mode, and
    during retraction of said movable armature said carrier is driven by said at least one planet gear and said sun gear to rotate away from said movable armature of said electromechanical solenoid to prevent friction between said movable armature and said engagement part during retraction of said movable armature.

2. The gear assembly according to claim 1, wherein, in the first mode, said clutch engages with said carrier to limit movement of said carrier relative to said clutch such that rotation of said sun gear drives said at least one planet gear to spin on an axis of said at least one planet gear without revolving around said sun gear so as to drive rotation of said outer ring gear.

3. The gear assembly according to claim 1, wherein, in the second mode, said clutch disengages from said carrier to allow movement of said carrier relative to said clutch such that said at least one planet gear is spinnable on an axis of said at least one planet gear and is revolvable around said sun gear so as to allow free rotation of said outer ring gear.

4. The gear assembly according to claim 1, wherein said electromechanical solenoid further includes:
    an electrically conductive housing which accommodates said electromagnetically inductive coil therein, which is formed with an opening for permitting movable extension of said movable armature therethrough into said electrically conductive housing, and which is grounded; and
    a dielectric cover which covers said opening of said electrically conductive housing, which is formed with a hole for the extension and retraction of said movable armature therethrough, and which provides electrical insulation between said movable armature and said opening of said electrically conductive housing;
    said sensor including an electrically conductive member which is disposed on said dielectric cover, which is electrically connected to said movable armature, and which is applied with a voltage;
    when said movable armature is retracted into said electrically conductive housing and said movable armature is in electrical contact with a bottom of said electrically conductive housing such that said electrically conductive member is grounded, variation in voltage of said electrically conductive member is measured so as to determine the retraction of said movable armature; and
    when said movable armature is extended from said electrically conductive housing and said movable armature is not in electrical contact with the bottom of said electrically conductive housing, said electrically conductive member is measured to maintain at the voltage so as to determine the extension of said movable armature.

5. The gear assembly according to claim 1, wherein said electromechanical solenoid further includes:

an electrically conductive housing which accommodates said electromagnetically inductive coil therein, and which is formed with an opening for permitting movable extension of said movable armature therethrough into said electrically conductive housing;
a cover which covers said opening of said electrically conductive housing, and which is formed with a hole for the extension and retraction of said movable armature therethrough; and
a spring which has two ends abutting against said cover and a stopper member fixed onto said movable armature, respectively;
when said movable armature is retracted into or extended from said electrically conductive housing such that a length of said spring is changed, said sensor measures variation in electrical resistance of said spring so as to determine one of the retraction and extension of said movable armature.

6. The gear assembly according to claim 1, wherein said electromechanical solenoid further includes:
an electrically conductive housing which accommodates said electromagnetically inductive coil therein, and which is formed with an opening for permitting movable extension of said movable armature therethrough into said electrically conductive housing;
said sensor including a strain gage which has one end attached to said movable armature and another end attached to said electrically conductive housing; and
when said movable armature is retracted into or extended from said electrically conductive housing such that said strain gage is deformed, said sensor measured variation in electrical resistance of said strain gage so as to determine one of the retraction and extension of said movable armature.

7. A door mount mechanism adapted to be mounted onto a door for rotating a thumb turn of a door lock which is mounted on the door, said door mount mechanism comprising:
a casing having a door-mounting end that is adapted for abutting against the door, and defining a receiving space that is adapted for receiving the door lock, and that has an opening at said door-mounting end and adapted for extension of the door lock therethrough;
a rotatable component coupled rotatably to said casing;
an intermediate coupling connected co-rotatably to said rotatable component, and adapted for driving rotation of the thumb turn of the door lock such that the thumb turn is co-rotatable with said rotatable component; and
an actuating unit controllable to actuate rotation of said rotatable component, and including a motor and a gear assembly, said gear assembly including
a planetary gear set which is driven rotatably by said motor and which includes:
a sun gear;
at least one planet gear meshing with said sun gear;
a carrier supporting said at least one planet gear; and
an outer ring gear meshing with said at least one planet gear, and
a clutch which is operable to engage with and disengage from said planetary gear set to enable said planetary gear set to switch between a first mode and a second mode;
wherein said clutch is an electromechanical solenoid which includes:
a movable armature,
an electromagnetically inductive coil which is wound around said movable armature, which produces an induced magnetic field when provided an electric current for applying forces to control extension and retraction of said movable armature relative to said electromagnetically inductive coil for engaging or disengaging said movable armature from said carrier, and
a sensor which detects the extension and retraction of said movable armature;
wherein said carrier is formed with at least one engagement part, said electromechanical solenoid is operable to engage with said engagement part for enabling said planetary gear set to operate in the first mode, and the electromechanical solenoid is operable to disengage from said engagement part for enabling said planetary gear set to operate in the second mode,
said movable armature is controlled to retract so as to disengage from said engagement part of said carrier to switch said planetary gear set from the first mode to the second mode, and
during retraction of said movable armature, said carrier is driven by said at least one planet gear and said sun gear to rotate away from said movable armature of said electromechanical solenoid to prevent friction between said movable armature and said engagement part.

8. The door mount mechanism according to claim 7, wherein, in the first mode, when said motor is not operating and is not driving rotation of said sun gear, rotation of said rotatable component is hindered by rotational resistance of said motor.

9. The door mount mechanism according to claim 7, wherein, in the second mode, said clutch disengages from said carrier to allow movement of said carrier relative to said clutch such that said at least one planet gear is spinnable on an axis of said at least one planet gear and is revolvable around said sun gear so as to allow free rotation of said outer ring gear.

10. The door mount mechanism according to claim 7, wherein said electromechanical solenoid further includes:
an electrically conductive housing which accommodates said electromagnetically inductive coil therein, which is formed with an opening for permitting movable extension of said movable armature therethrough into said electrically conductive housing, and which is grounded; and
a dielectric cover which covers said opening of said electrically conductive housing, which is formed with a hole for the extension and retraction of said movable armature therethrough, and which provides electrical insulation between said movable armature and said opening of said electrically conductive housing;
said sensor including an electrically conductive member which is disposed on said dielectric cover, which is electrically connected to said movable armature, and which is applied with a voltage;
when said movable armature is retracted into said electrically conductive housing and said movable armature is in electrical contact with a bottom of said electrically conductive housing such that said electrically conductive member is grounded, variation in voltage of said electrically conductive member is measured so as to determine the retraction of said movable armature; and
when said movable armature is extended from said electrically conductive housing and said movable armature is not in electrical contact with the bottom of said electrically conductive housing, said electrically conductive member is measured to maintain at the voltage so as to determine the extension of said movable armature.

11. The door mount mechanism according to claim 7, wherein said electromechanical solenoid further includes:
    an electrically conductive housing which accommodates said electromagnetically inductive coil therein, and which is formed with an opening for permitting movable extension of said movable armature therethrough into said electrically conductive housing;
    a cover which covers said opening of said electrically conductive housing, and which is formed with a hole for the extension and retraction of said movable armature therethrough; and
    a spring which has two ends abutting against said cover and a stopper member fixed onto said movable armature, respectively;
    when said movable armature is retracted into or extended from said electrically conductive housing such that a length of said spring is changed, said sensor measures variation in electrical resistance of said spring so as to determine the retraction and extension of said movable armature.

12. The door mount mechanism according to claim 7, wherein said electromechanical solenoid further includes:
    an electrically conductive housing which accommodates said electromagnetically inductive coil therein, and which is formed with an opening for movable extension of said movable armature therethrough into said electrically conductive housing;
    said sensor including a strain gage which has one end attached to said movable armature and another end attached to said electrically conductive housing; and
    when said movable armature is retracted into or extended from said electrically conductive housing such that said strain gage is deformed, said sensor measured variation in electrical resistance of said strain gage so as to determine the retraction and extension of said movable armature.

13. The door mount mechanism according to claim 7, wherein said rotatable component is formed with gear teeth for meshing with said outer ring gear.

14. The door mount mechanism according to claim 7, wherein, in the first mode, said clutch engages with said carrier to limit movement of said carrier relative to said clutch such that rotation of said sun gear drives said at least one planet gear to spin on an axis of said at least one planet gear without revolving around said sun gear so as to drive rotation of said outer ring gear.

* * * * *